United States Patent [19]
Webster

[11] Patent Number: 5,760,865
[45] Date of Patent: Jun. 2, 1998

[54] GLASSES FOR VIEWING TWO SCENES SIMULTANEOUSLY

[76] Inventor: Colin Webster, 25 Morrow Avenue, Toronto, Canada, M6R 2H9

[21] Appl. No.: 612,684

[22] Filed: Mar. 8, 1996

[51] Int. Cl.⁶ .................. G02C 00/00; G02B 5/08
[52] U.S. Cl. .................. 351/41; 359/855; 359/857
[58] Field of Search .................. 351/41, 44, 158, 351/50; 359/842, 855, 857, 862, 865

[56] References Cited

U.S. PATENT DOCUMENTS

| | | |
|---|---|---|
| 2,909,959 | 10/1959 | Girden ........................... 351/41 |
| 3,019,689 | 2/1962 | Paulsrud ......................... 351/41 |
| 3,058,392 | 10/1962 | Primeu .......................... 351/41 |
| 4,375,316 | 3/1983 | Le Vantine . | 
| 4,679,916 | 7/1987 | Roller et al. . |
| 5,148,327 | 9/1992 | Gaxiola, Jr. . |

FOREIGN PATENT DOCUMENTS 2430625  3/1980  France ....................... 351/41

OTHER PUBLICATIONS

Article published in The Globe & Mail newspaper on Tuesday, Apr. 19, 1994 entitled Almost Enough To Make A Dentist's Chair Fun.

Primary Examiner—Huy Mai

[57] ABSTRACT

An optical device that reflectively superimposes a virtual image of an object viewed in one direction on a transparent lens member through which a second object may simultaneously be viewed in a second direction. The optical device comprises a transparent member and reflecting member adapted to reflect the image of an object onto the transparent member where it may be viewed by a person looking through the transparent member at another object. The reflecting member preferably is adapted to receive the face of the person utilizing the device and defines a nose bridge and cheekbone pockets for that purpose.

22 Claims, 6 Drawing Sheets

GLASSES FOR VIEWING TWO SCENES SIMULTANEOUSLY

BACKGROUND OF THE INVENTION

The invention relates to the field of optical aids for sportsmen and others who need to simultaneously view two distinct scenes located along different lines of sight. In particular, the invention relates to visors wearable by cyclists, skiers, in-line skaters, scuba divers and others who desire to move their bodies and/or vehicles as aerodynamically as possible, i.e. with their heads facing downwardly, while safely viewing objects and the terrain in front of them.

In recent years, great advances have been made in bicycle design, cycling apparel, helmet design and cycling techniques aimed at reducing rolling and wind resistance thereby maximizing the efficiency of the bicycle as a racing vehicle. Similar problems have been addressed in downhill ski racing with similar results. However, it remains that the vast bulk of aerodynamic resistance is attributable to one's body.

The most aerodynamically efficient riding or skiing position is the full tuck (in skiing) or crouch (in cycling) in which the torso is approximately parallel to the ground, the face is pointed down to face the ground (hereinafter the "prone position"), the hands are extended (over low, forwardly-mounted handle bars in the case of cycling) and the elbows are tucked in to the body. It is desirable that this position be maintained for as long as possible during a race or trip to conserve energy and maximize speed. However, without optical assistance, a rider or skier must regularly raise his head to check his position on the road or hill and ensure that no obstacles are in his path. Therefore, the competing interests of safety and efficiency must be carefully balanced.

One accommodation that a rider or skier may attempt is to maintain a partial tuck or crouch with his head bent up so he can see forward. This position is uncomfortable and virtually impossible to safely maintain over long distances. In any event, it is less aerodynamic than a full tuck or crouch with the head in the prone position.

Many tasks also require a person to simultaneously monitor different locales at the same time. Hitherto a person was required to shift his or her gaze from one scene to the other and take the chance that relevant information might be missed.

A number of devices have been designed to permit a cyclist to see forward while riding in a full crouch with the head facing down. One type of such device is disclosed in U.S. Pat. No. 5,148,327, issued Sep. 15, 1992 to Gaxiola. Jr. and U.S. Pat. No. 4,375,316, issued Mar. 1, 1983 to Le Vantine. Each of these devices comprises a pair of mirrors mounted on the handle bars of a bicycle. In use, the image of an object being viewed is reflected off a first mirror down onto a second mirror and up into the eyes of the user when he looks at the second mirror.

Such an arrangement has numerous disadvantages. Vibration of the bicycle frame can distort the image being viewed. Also, such devices do not easily accommodate changing riding positions or else require adjustment during motion, which is unsafe. Moreover, the field of view is limited, and one must turn the handlebars to see the view from the side. In addition, the mirrors themselves cause the very drag the rider is seeking to avoid. Obviously, such devices cannot be used without a bicycle or other vehicle, so this device does not present a solution to a skier, for example.

A second type of device, described in U.S. Pat. No. 4,679,916, issued Jul. 14, 1987 to Roller et al, seeks to overcome some of these problems. The Roller reference discloses a frame for mounting mirrors about the eyes of a cyclist and a method of viewing related thereto. The Roller reference discloses the attachment of separate, spaced-apart mirrors within a transparent hood.

At least two major disadvantages arise from such an arrangement. First, the very inclusion of projecting mirror elements within an optical device worn about the eyes is potentially dangerous. In a crash, such elements could become detached or break into and/or be impacted by the face or eyes of the wearer depending upon the type and force of blow sustained by the frame. This is obviously undesirable.

Second, if the mirrors are large enough to provide a practical field of vision, they tend to obscure the wearer's view in the heads-up position. Conversely, if the mirrors are small and widely spaced-apart as described in the Roller reference, substantial blind spots are created, thereby imperilling the wearer. Additionally, the wearer cannot simultaneously monitor the route in front of him while also looking down at his bicycle or skis, as appropriate.

It is an object of the present invention to address the disadvantages of the prior art through the provision of an improved optical device which permits the user to view an image of any object or scene positioned along one line of sight superimposed over a direct view of a different object or scene along a second line of sight.

SUMMARY OF THE INVENTION

According to a first broad aspect of the invention, there is provided an optical device for permitting a person to view two scenes simultaneously. The optical device includes a transparent, substantially rigid, sheet member through which a first object or scene can be viewed along a first line of sight. The transparent member has an outer surface and an inner surface. A reflecting member is also provided for reflecting and superimposing onto the transparent sheet member a reflected image of a second object or scene located along a second line of sight, whereby the second object can be viewed simultaneously with the first object by the person.

According to a second broad aspect of the invention, there is provided a visor adapted to be worn over a wearer's eyes. The visor includes a front lens section and retaining means for holding the visor on the wearer's head. The front lens is coupled to the retaining means and has a bottom viewing portion and a top portion. The viewing portion can be clearly seen through, and is positioned across the wearer's normal field of view when the visor is worn and is partially reflective to light striking an inner surface thereof. The top portion is adapted to receive the wearer's forehead. There is also a reflector having a reflecting surface for reflecting onto the bottom viewing portion an image of an object located along a line of sight which is at a substantial acute angle or 90° degrees to said reflecting surface, whereby said object can be viewed simultaneously with another object being viewed by the wearer directly through said bottom viewing portion.

DETAILED DESCRIPTION OF PREFERRED EMBODIMENTS

Figure 1:
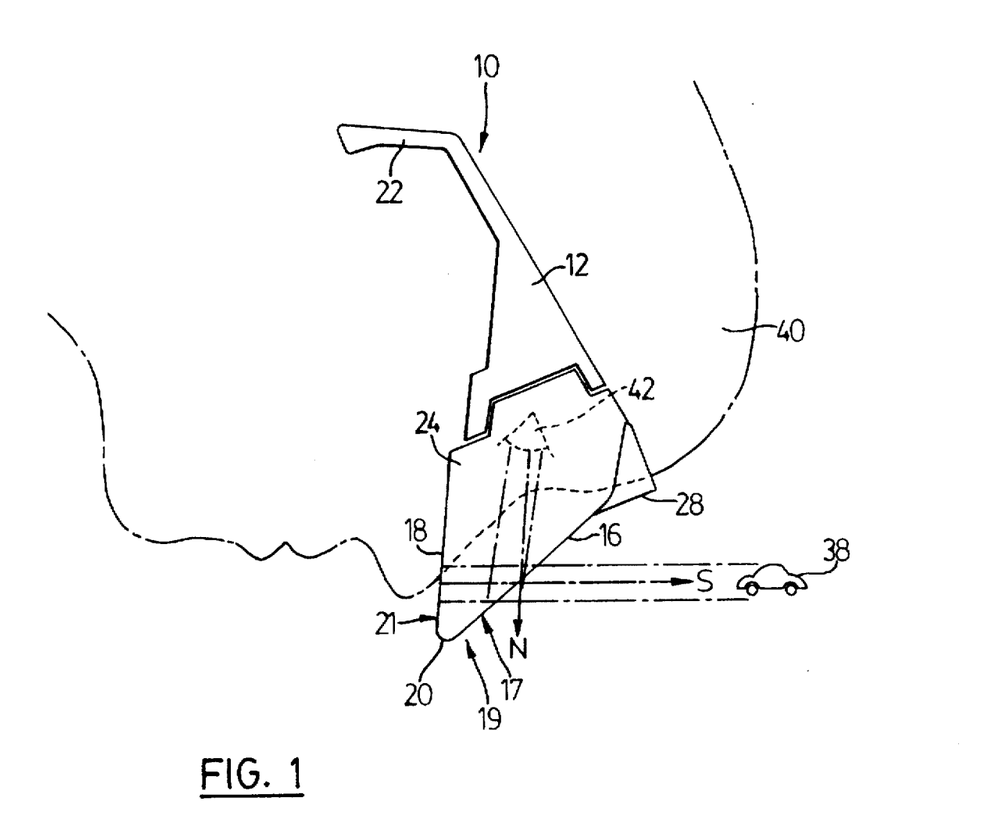
FIG. 1 illustrates a side plan view of a person's head, shown in phantom, looking downward through a preferred embodiment of an optical device according to the present invention to obtain a view of the ground as well as to view a distant, forwardly positioned, object.

Referring to FIGS. 1 to 4, a preferred embodiment of an optical viewing apparatus (hereinafter the "visor") according to the present invention is generally indicated by reference numeral 10. In FIG. 1, visor 10 is shown in place on a wearer's head 40 and includes a front lens 16 and a reflective member 18 which are attached at a leading edge 20 at an angle θ relative to one another to form a hood, indicated generally by reference numeral 19, over the wearer's eyes. It is desirable that angle θ be between 40° and 50° for an embodiment, such as that depicted, adapted to be used to view objects along a line of sight S generally perpendicular to the wearer's normal line of sight N. It will be appreciated, however, that angle θ may vary depending upon the relative orientations of lines of sight S and N. Moreover, visor 10 may be constructed so that angle θ may be adjusted to alter line of sight S, i.e. wherein lens 16 and reflective member 18 are angularly movable relative to one another.

The front lens 16 is a substantially rigid sheet member having inner and outer surfaces which are parallel to one another and are separated by only a relatively short distance. The reflective member 18 is also preferably a substantially rigid sheet member having exposed inner and outer surfaces.

Figure 4:
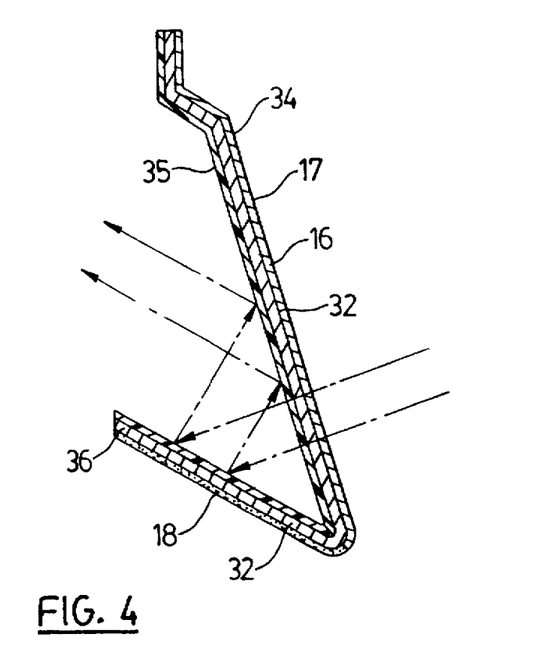
FIG. 4 is a cross-sectional view, taken along line IV—IV of FIG. 2. of a lens employed in the preferred optical device.

Front lens 16 is partially reflective in the sense that it will reflect some of the light hitting it and transmit the remainder depending upon the angle of incidence of the light relative to the lens and the reflective characteristics of the lens 16. The reflectivity of the lens 16 can vary depending upon the material from which the lens 16 is manufactured. In fact, it is possible for lens 16 to have a reflectivity of approximately 20% to 70%, depending upon the environment in which the visor is to be employed. In the preferred embodiment, lens 16 is constructed from polycarbonate and features an anti-reflective coating 34, known in the art per se, on the outer surface of the lens 16 and a dielectric beam splitting coating 35 on the inner surface of the lens 16. The anti-reflective coating 34 which preferably only allows polarized light to pass through, prevents excessive glare from reaching the wearer's eyes. The dielectric beam splitter coating 35 as known by persons skilled in the art, provides means for enhancing the reflectivity of the polycarbonate material.

It should be appreciated, however, that other effective coatings or arrangements thereof can be applied by persons skilled in the art to obtain desired transmissive and reflective characteristics, and indeed, a translucent polycarbonate or other plastic-based lens without any coatings thereon can be used for front lens 16. In any embodiment, however, it is preferred that lens 16 be tinted, so as to reduce glare and enhance the contrast upon which the superimposed image, as described more fully below, is viewed. Dark grey tints have been found particularly useful for this purpose.

Figure 5:
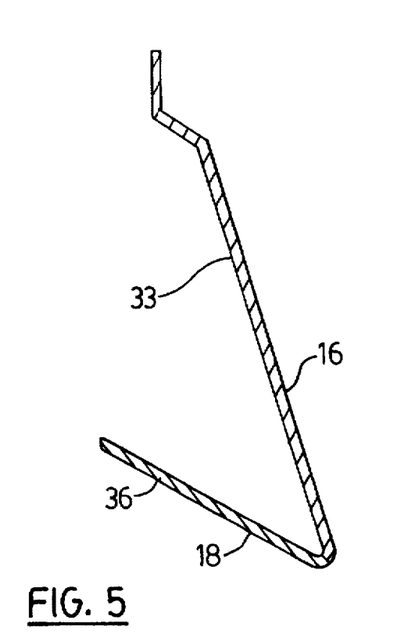
FIG. 5 is a cross-sectional view similar to FIG. 4 but showing an alternative embodiment of a lens employed in the invention.

Reflective member 18 may be formed of a single layer of reflective material as depicted in FIG. 5 or may be bi-layered as depicted in FIG. 4. The latter approach is preferred since it permits the front lens 16 to be formed from the same sheet of lens material as substrate 32 of member 18 so that they are integral with each other. In this case, as shown in FIG. 4, a reflective layer 36 of material, such as an opaque metal coating, is applied or attached to the inner surface of the substrate 32. The reflective layer 36 is chosen so that it is a mirror or is mirror-like either in and of itself or in conjunction with the substrate 32 against which it abuts. It will be appreciated that a great variety of reflective materials or combinations of materials may be selected and used for the purposes of the invention. Preferably, however, such materials should be as uniform and reflective as possible.

Referring particularly to FIG. 1, the visor 10 provides two images to the wearer thereof, i.e., the observer. A first image, from the observer's normal line of sight N, is transmitted by lens 16 directly to the observer. A second image, from the observer's generally perpendicular line of sight S, is transmitted by lens 16 onto reflective member 18, which reflects the second image back onto the inside surface of the lens 16, whereon the partially reflective inner surface thereof further reflects the second image to the observer. In this manner the second image is superimposed onto lens 16 whereby the observer can simultaneously view the two images.

It is desirable that reflective member 18 be oriented at an acute angle to the horizontal so that it slants downwardly and away from the face of the wearer in order to ensure that during use sunlight is less likely to be reflected off reflective member 18 into the eyes of wearer. Such an orientation is also less distracting for the wearer since the reflective member 18 itself is less observable by the wearer. It will be appreciated that this angle of slope of the member 18 can vary depending upon the dimensions of the intended wearer's face or the size of the visor. In particular, setting this angle at between 10° and 30° to the horizontal when the wearer's head is upright has been found to be useful.

Front lens 16 includes a generally planar portion 17, and a top portion or forehead flange 28, for receiving the wearer's forehead. Alternatively, a separate forehead flange (not shown) can be attached to the front lens 16. Preferably, the forehead flange 28 is padded by forehead pad 44 for which purpose a thin neoprene foam strip is ideal.

Reflective member 18 is adapted to receive the nose and cheekbones of the wearer's head 40. Member 18 has a leading edge portion 21 and a trailing edge portion defining a pair of cheek pockets 48 and a nose bridge 30 therebetween. The sizes and shapes of cheek pockets 48 and nose bridge 30 can be selected to fit a specific wearer's face or to accommodate a range of individuals.

Figure 6:
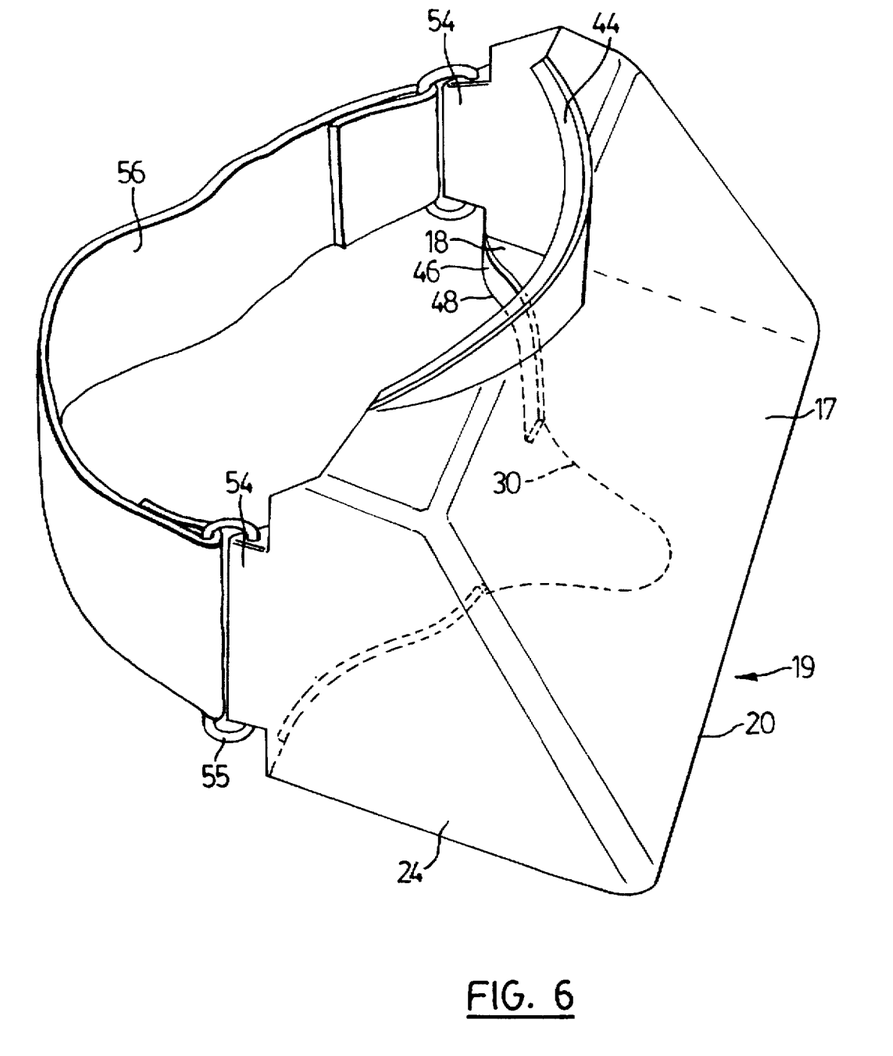
FIG. 6 is a perspective view of an alternative embodiment of an optical device according to the present invention.

If desired, each of the cheek pockets 48 can be lined with cheek pads 46 (see FIG. 6). A variety of padding materials may be used to cushion the face against impact and to further define the shape of the cheek pockets 48 for the above-described purposes.

Although lens 16 and reflective member 18 are shown in the drawing as being generally planar in shape, it should be appreciated that alternative embodiments can assume other shapes, such as being curvilinear in horizontal and/or vertical planes. It is important, however, that lens 16 and reflective member 18 be correspondingly shaped so as to not distort the superimposed image seen by the wearer.

Figure 2:
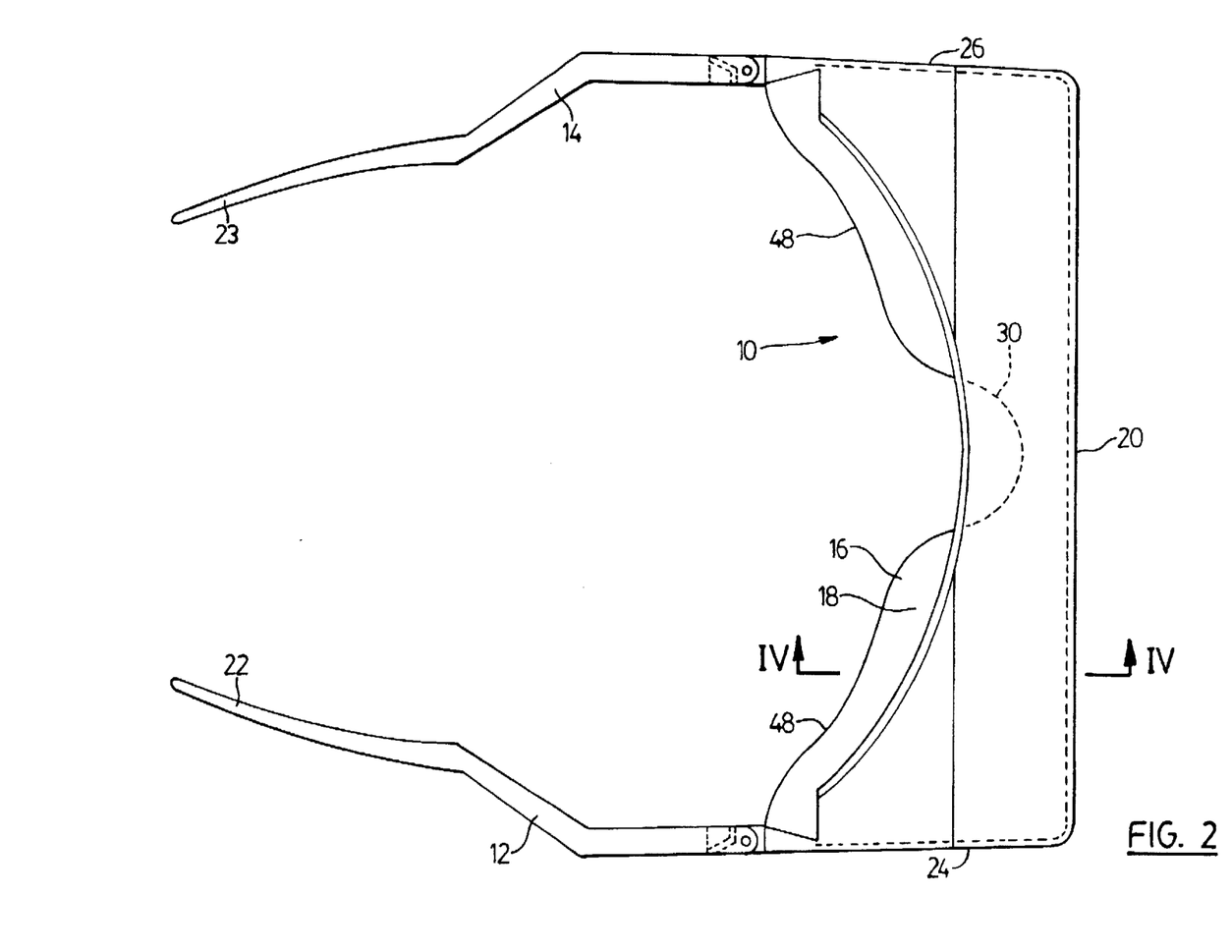
FIG. 2 is a top plan view of the preferred optical device.

In order to provide increased structural strength, it is desirable to connect the trailing edge of front lens 16 to reflective member 18. This can be accomplished in numerous ways. Preferably, right and left side lenses 24 and 26 are provided for connection to the right and left peripheral edges, respectively, of both the front lens 16 and reflective member 18 so as to form the sides of hood 19. Each side lens is preferably similarly tinted to front lens 16 but need not be reflective.

Figure 3:
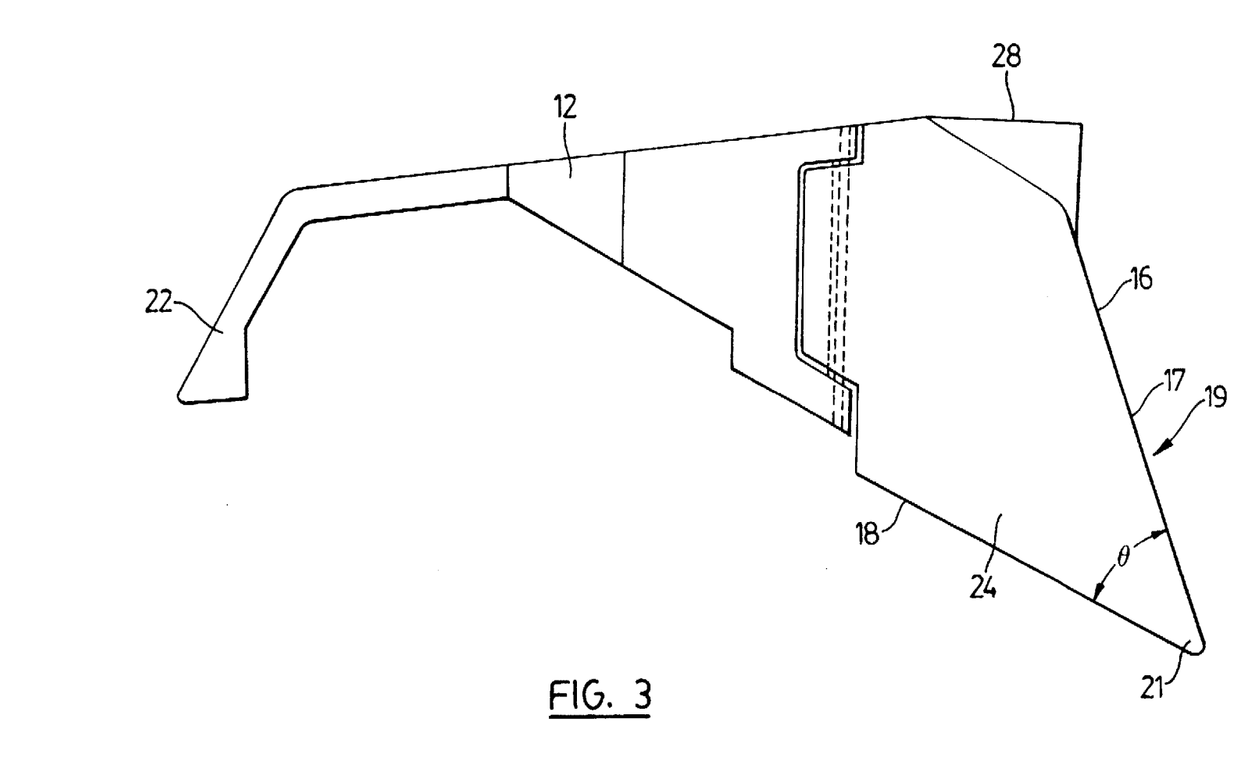
FIG. 3 is a side view of the preferred optical device according to the present invention.

Additional structural support for hood 19 can be afforded by the provision of left arm 14 and right arm 12, one end of each of which is bent into left earpiece 23 and right earpiece 22, respectively. The other end of each arm 12 or 14 is attached to hood 19 along the trailing edge of one of side lenses 24 or 26, respectively, so as to connect front lens 16 to reflective member 18. Preferably standard metal hinges pivotally connect these arms to the side lenses. If desired, additional strengthening can be afforded by providing a variety of frame structures along the trailing edges of the hood 19. However, care should be taken not to enlarge the minimized blind spot area afforded by the invention.

In an alternative embodiment, as depicted in FIG. 6, side lenses 24 and 26 are each provided with a strap holding tab 54, formed of the same material as the side lenses and integral therewith. Each tab 54 forms an elongate hole which receives a metal strap connector 55 that can be used to attach strap 56 to the side lens.

In use, visor 10 is worn on head 40 so that the generally planar portion 17 of front lens 16 is positioned across the normal field of view of the wearer. The normal field of view can for these purposes be considered to be that area which can be seen when the eyes are looking straight ahead, perpendicularly to the plane defined by the wearer's face. Either arms 12, 14 or strap 56 is used to hold the visor 10 in place.

When the visor 10 is worn, the wearer's nose fits into nose bridge 30 and the wearer's cheekbones fit into cheek pockets 48, all of which are defined by the trailing edge of reflective member 18 as described above.

When properly worn, as described above, the wearer can see through front lens 16 simply by focusing on the object being viewed in the normal manner. When the head is held upright, the visor will function as a wind hood and sunglasses, if appropriately tinted.

When the wearer's head is allowed to fall to the prone position (i.e. face down) as depicted in FIG. 1, a virtual image created by light reflected off, or, in the case of luminous objects, produced by an object 38 in front of the wearer in the horizontal plane can be viewed by the wearer by focusing on the inside surface 33 of front lens 16. Light from the object 38 passes through front lens 16, reflects off reflective member 18 onto inner surface 33 of front lens 16 and is further reflected into the wearer's eyes 42 (only one of which is depicted). The virtual or superimposed image created will appear to cover substantially the entire surface 33 of front lens 16 thereby providing enhanced peripheral vision. Moreover, the superimposed image will be upright due to the double reflection. For clarity of viewing, it is desirable that the background visible behind the image be dark to maximize contrast. Dark pavement is of course an ideal for background. If the visor 10 is worn during skiing, contrast could be improved if the wearer's extended arms were clothed in dark material. Should a rider wish to look down at the ground or at her bicycle gear shift, for example, she need only refocus her eyes through the image onto the object being viewed. Even in this focus, movement or objects in front of her can be detected from the out of focus image which remains in peripheral view at all times.

Figure 7:
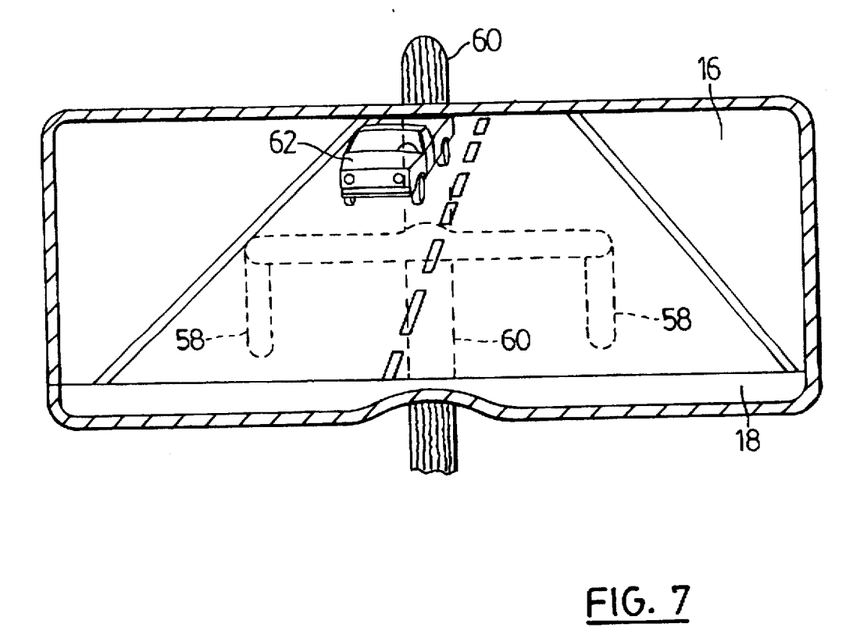
FIG. 7 is a perspective-view illustration of the view through the alternative embodiment of the optical device of FIG. 6.

FIG. 7 illustrates the view seen by a bicycle rider when using the optical device of FIG. 6. With his head facing downwardly, he can see the real image of the bicycle handlebars 58 and the bicycle wheel 60. The rider can also see the reflected upright images of an oncoming vehicle 62 and the road ahead.

It will be understood by persons skilled in the art that numerous alternations and modifications may be made to the embodiments depicted and described herein without departing from the spirit and scope of the invention.

I claim:

1. An optical device for permitting a person to view two scenes simultaneously comprising:

a transparent, substantially rigid, sheet member through which a first object is viewable along a first line of sight, the transparent sheet member having an outer surface and an inner surface which are parallel to each other and are separated by only a relatively short distance, the transparent sheet member being partially reflective of light striking said inner surface; and a reflecting member for reflecting and superimposing onto the transparent sheet member a reflected image of a second object located along a second line of sight, whereby the second object can be viewed simultaneously with said first object by said person.

2. An optical device as described in claim 1, wherein the reflecting member is a sheet member oriented at a substantial acute angle to the transparent sheet member so that light travelling from the second object along the second line of sight will be reflected onto said inner surface of the transparent member.

3. An optical device as described in claim 2, wherein the reflecting sheet member is attached to the transparent sheet member along a common leading edge portion.

4. An optical device as described in claim 3, wherein the reflecting sheet member includes a structural bottom layer integral with the transparent sheet member and a reflective coating on an inner surface of the bottom layer.

5. An optical device as described in claim 3 wherein the transparent sheet member is tinted.

6. An optical device as described in claim 2, wherein said second line of sight passes through the transparent sheet member.

7. An optical device as described in claim 6 including retaining means for retaining the optical device on the person's head so that the first line of sight is within the person's normal field of view and the reflecting member is below the person's normal line of sight.

8. An optical device as described in claim 7 wherein the second line of sight is generally perpendicular to the first line of sight.

9. An optical device as described in claim 7 wherein the reflecting sheet member is oriented relative to the transparent sheet member such that when the person looks downward the normal line of sight is substantially in a vertical plane and the superimposed image is of a distant object located in front of the optical device in a horizontal direction.

10. An optical device as described in claim 7 wherein the reflecting sheet member is located below the person's normal line of sight when the person's head is held upright.

11. An optical device as described in claim 7 wherein the retaining means include a pair of spaced-apart side arms adapted to receive the wearer's head therebetween.

12. An optical device as described in claim 2 including support means for fixing the transparent sheet member to the reflecting member without distorting the superimposed reflected image.

13. An optical device as described in claim 2 wherein the angle between the transparent sheet member and reflecting sheet member is between 40° and 50°.

14. An optical device as described in claim 13 wherein said angle is 40°.

15. An optical device as described in claim 2 wherein the transparent sheet member includes an anti-reflective coating on the outer surface thereof for reducing glare.

16. An optical device as described in claim 2 wherein the transparent sheet member includes a dielectric beam-splitter coating on the inner surface thereof for enhancing the reflectivity of the inner surface of the transparent sheet member.

17. An optical device as described in claim 1 wherein said reflecting member is a substantially rigid sheet member having exposed inner and outer surfaces.

18. A visor adapted to be worn over a wearer's eyes comprising:

retaining means for retaining the visor on the wearer's head;

a front lens section coupled to the retaining means having a bottom viewing portion, which can be clearly seen through, and a top portion, the viewing portion being made of a substantially rigid, sheet member having parallel outer and inner surfaces which are separated by only a relatively short distance, the viewing portion being positioned across the wearer's normal field of view when the visor is worn and being partially reflective to light striking an inner surface thereof, the top portion being adapted to receive the wearer's forehead; and a reflector having a reflecting surface for reflecting onto said bottom viewing portion an image of an object located along a line of sight which is at a substantial acute angle or 90 degrees to said reflecting surface, whereby said object can be viewed simultaneously with another object being viewed by the wearer directly through said bottom viewing portion.

19. A visor as described in claim 18 wherein said reflector has a leading edge and a trailing edge adapted to receive the wearer's face, the reflector being attached to the front lens section along said leading edge.

20. A visor as described in claim 19 wherein the trailing edge defines a nose bridge.

21. A visor as described in claim 20 wherein the trailing edge also defines a pair of cheekbone pockets.

22. A visor as described in claim 19 wherein said top portion is curved along a rear surface thereof to follow the curvature of the wearer's forehead.

* * * * *